US012238482B2

(12) United States Patent
Luan et al.

(10) Patent No.: US 12,238,482 B2
(45) Date of Patent: Feb. 25, 2025

(54) SUSPENSION OF A RECEIVER OF A HEARING DEVICE

(71) Applicant: GN Hearing A/S, Ballerup (DK)

(72) Inventors: Yu Luan, Lyngby (DK); Anders Hjermø Michaelsen, Bagsværd (DK); Gojko Obradovic, København S (DK)

(73) Assignee: GN HEARING A/S, Ballerup (DK)

( * ) Notice: Subject to any disclaimer, the term of this patent is extended or adjusted under 35 U.S.C. 154(b) by 290 days.

(21) Appl. No.: 17/948,226

(22) Filed: Sep. 20, 2022

(65) Prior Publication Data

US 2023/0099122 A1 Mar. 30, 2023

(30) Foreign Application Priority Data

Sep. 24, 2021 (DK) ........................... PA 2021 70464

(51) Int. Cl.
*H04R 25/00* (2006.01)

(52) U.S. Cl.
CPC ........... *H04R 25/456* (2013.01); *H04R 25/70* (2013.01)

(58) Field of Classification Search
None
See application file for complete search history.

(56) References Cited

U.S. PATENT DOCUMENTS

| | | | | |
|---|---|---|---|---|
| 5,887,070 | A | 3/1999 | Iseberg et al. | |
| 6,459,800 | B1 | 10/2002 | Brimhall | |
| 10,499,166 | B2 * | 12/2019 | Margot | H04R 25/604 |
| 10,616,680 | B2 | 4/2020 | Bolsman et al. | |
| 11,516,602 | B2 * | 11/2022 | Rucker | H02J 7/0042 |
| 2002/0025055 | A1 | 2/2002 | Stonikas et al. | |
| 2003/0162000 | A1 | 8/2003 | Landvik | |
| 2019/0278556 | A1 | 9/2019 | Usher et al. | |
| 2020/0314563 | A1 | 10/2020 | Friis et al. | |

FOREIGN PATENT DOCUMENTS

| | | | |
|---|---|---|---|
| EP | 1248496 A2 | 10/2002 | |
| GB | 2155276 | 9/1985 | |
| WO | WO 2012/125451 | 9/2012 | |
| WO | WO 2017/167395 | 10/2017 | |

OTHER PUBLICATIONS

Foreign Search Report for Danish Patent Appln. No. PA 2021 70464 dated Mar. 8, 2022.
Extended European Search Report for EP Patent Appln. No. 21198826.6 dated Mar. 4, 2022.

* cited by examiner

*Primary Examiner* — Paul W Huber
(74) *Attorney, Agent, or Firm* — Vista IP Law Group, LLP

(57) ABSTRACT

The disclosure relates to a hearing device, e.g., a hearing aid, wherein open-cell foam is compressed between a receiver and a second section, e.g., receiver chamber, of the hearing device, a method for providing such hearing device, and a method for identifying a desired property of such open-cell foam of such hearing device. The hearing device comprises a first section comprising the open-cell foam being compressed, such that the open-cell foam has at least a strain value of a first point of an elastic modulus-strain curve of the open-cell foam and at most the strain value of a third point of the elastic modulus-strain curve, and such that the receiver is connected to the second section via the first section.

17 Claims, 6 Drawing Sheets

SUSPENSION OF A RECEIVER OF A HEARING DEVICE

RELATED APPLICATION DATA

This application claims priority to, and the benefit of, Danish Patent Application No. PA 2021 70464 filed on Sep. 24, 2021. The entire disclosure of the above application is expressly incorporated by reference herein.

FIELD

The disclosure relates to a hearing device, e.g., a hearing aid, wherein open-cell foam is compressed between a receiver and a second section of the hearing device, a method for providing such hearing device, and a method for identifying a desired property of such open-cell foam of such hearing device.

BACKGROUND

A hearing aid is an electroacoustic device configured for amplifying sound for a user to correct or mitigate a hearing loss. Certain types of hearing aids, referred to as behind-the-ear (BTE) hearing aids, utilize a housing that is worn behind an ear of the user. The BTE hearing aid comprises a receiver that may conduct sound to an earpiece inside the ear of the user, for instance via a sound tube of the hearing aid. A receiver is an electro-acoustic transducer (e.g., speaker or loudspeaker) that is configured to convert electrical signals to acoustic signals. The generation of acoustic signals by the receiver causes the receiver to vibrate, which may affect the overall performance of the hearing aid. For instance, the vibrations generated by the receiver may be transmitted back to one or more microphones of the hearing aid, causing unwanted feedback, which in turn lowers the gain, i.e., the possible gain and/or the desired gain. It is often desired that the feedback signal is attenuated as much as possible to increase the stability of the system. Often, one or more microphones of the hearing aid are soldered to a PCB of the hearing aid and are thus considered hard mounted within the hearing aid.

According to prior art solutions, a receiver may be suspended within a receiver chamber of a hearing aid using rubber suspension.

SUMMARY

The above considerations may at least in part apply to other types of hearing aids and/or other hearing devices, in particularly but not necessarily limited to hearing devices comprising one or more microphones. The inventors of the subject disclosure have realized a need to overcome the abovementioned and other shortcomings of the prior art.

The inventors have realized a need for providing: a hearing device having an improved or at least an alternative suspension of a receiver; a method for providing a hearing device with such suspension; and a method for identifying a desired property of such suspension.

Vibroacoustic stability may pose a challenge for hearing devices, such as for various hearing aid devices, such as in particularly for BTE hearing aids. A high stability of a hearing aid is usually desired since it may enable a high gain, which may be desired. One major cause of decrease of stability of a hearing aid is usually vibration from the receiver being transmitted, through the hearing aid structure and/or the hearing aid housing, to one or more microphones of the hearing aid. Similar may apply for any hearing device comprising a receiver and a microphone.

Impact robustness of a hearing device, such as a hearing aid, pose another challenge. An impact may for instance be caused by a drop of the hearing device on a hard surface. Typically, a receiver of the hearing device is the component or one of the components being most prone to damage if the hearing device is subject to impact. Therefore, there is a need to protect the receiver from impact.

It may be an object to facilitate improvement of one, more, or all of the following, and/or to provide a desired compromise between some or all of the following, i.e., relating to a receiver of a hearing device such as a hearing aid:

impact resistance,
vibroacoustic stability,
miniaturization, and
cost reduction and/or efficiency of manufacture.

Improvement of vibroacoustic stability of the receiver may imply an improved attenuation of vibrational noise from the receiver to a microphone (such as any microphone) of the hearing device, which in turn may enable a higher gain of the hearing device.

Cost reduction and/or efficiency of manufacture may include cost reduction of material(s) and/or ease of manufacture/assembly.

To achieve one or more of the above-mentioned needs and/or objectives and/or further needs/objectives, the following aspects are provided in accordance with some embodiments.

According to a first aspect, there is provided a hearing device comprising: a receiver, a first section, and a second section. According to the first aspect, the first section comprises open-cell foam having an elastic modulus-strain curve (or relation) having a first point, a second point, and a third point, wherein the second point is defined by a global minimum of the elastic modulus, and wherein the first point is defined by a knee point before the second point, and wherein the third point is located after the second point and has an elastic modulus value being equal to the elastic modulus value of the first point. According to the first aspect, the open-cell foam is compressed between the receiver and the second section, such that the open-cell foam has at least the strain value of the first point and at most the strain value of the third point. According to the first aspect, the compression of the open-cell foam between the receiver and the second section is such that the receiver is connected to the second section via the first section, i.e., via at least the compressed open-cell foam.

According to a second aspect, there is provided a method for providing a hearing device comprising a receiver, a first section, and a second section, wherein the first section comprises open-cell foam having an elastic modulus-strain curve having a first point, a second point, and a third point, wherein the second point is defined by a global minimum of the elastic modulus, and wherein the first point is defined by a knee point before the second point, and wherein the third point is located after the second point and has an elastic modulus value being equal to the elastic modulus value of the first point. According to the second aspect the method comprises compressing the open-cell foam between the receiver and the second section, such that the open-cell foam has at least the strain value of the first point and at most the strain value of the third point, and such that the receiver is connected to the second section via the first section, i.e., via at least the compressed open-cell foam.

According to a third aspect, there is provided a method for identifying a desired compression of open-cell foam between a receiver and a second section of a hearing device. Throughout the present disclosure the method according to the third aspect is abbreviated "the method for identifying". According to the third aspect the method for identifying comprises identifying a global minimum of an elastic modulus-strain curve of the open-cell foam.

According to a fourth aspect, there is provided a hearing device comprising: a receiver, a first section, and a second section. According to the fourth aspect, the first section comprises open-cell foam. According to the fourth aspect, the open-cell foam is compressed between the receiver and the second section such that the receiver is connected to the second section via the first section. According to the fourth aspect, the receiver has a resonance frequency being a function of strain of the open-cell foam defining a curve that has a primary point defined by a knee point before a secondary point defined by a global minimum of the resonance frequency. According to the fourth aspect, the open-cell foam is compressed between the receiver and the second section such that the open-cell foam is strained to at least the strain value of the primary point.

According to a fifth aspect, there is provided a hearing device comprising: a receiver, a first section, and a second section. According to the fifth aspect, the first section comprises open-cell foam. According to the fifth aspect, the open-cell foam is compressed between the receiver and the second section, such that the open-cell foam has a strain value (i.e., compression) of at least 10% and at most 35% between the receiver and the second section. According to the fifth aspect, the compression of the open-cell foam between the receiver and the second section is such that the receiver is connected to the second section via the first section.

According to a sixth aspect, there is provided a hearing device comprising:

a receiver, a first section, and a second section. According to the sixth aspect, the first section comprises open-cell foam. According to the sixth aspect, the open-cell foam is compressed between the receiver and the second section, such that the receiver is connected to the second section via the first section.

According to a seventh aspect, a method for providing the hearing device according to the fourth and/or fifth and/or sixth aspect is provided, the method comprising compressing the open-cell foam between the receiver and the second section.

Throughout the present disclosure the phrase "the receiver is connected to the second section via the first section" may be understood such that the receiver is held and/or supported and/or suspended by the second section via the first section. Accordingly, the first section may hold and/or support and/or suspend the receiver, i.e., relative to the second section. This may be achieved by the first section contacting the receiver and contacting the second section, i.e., one part of the first section may contact the receiver and another part (e.g., an opposing and/or encircling part) of the first section may contact the second section.

In accordance with one or more embodiments described herein, providing the desired compression, also denoted pre-compression or strain (i.e., compressive strain), of the open-cell foam between the receiver and the second section, facilitates an improved, or at least an alternative, suspension of the receiver. Suspension of the receiver as described herein may be provided as an alternative or in addition to another suspension of the receiver of the hearing device, for instance in addition to an optional suspension provided via, at, or by a sound tube of the hearing device connected to the receiver, e.g., via a rubber suspension held between the receiver and the sound tube. The term "sound tube" may refer to a "sound canal". The desired compression value or compression range of the open-cell foam may provide an optimized and/or improved impact resistance of the receiver and vibroacoustic stability of the hearing device or a desired compromise hereof.

According to prior art, the above-mentioned objects of vibroacoustic stability and impact protection are usually handled by different aspects or different parts of a receiver suspension of a hearing device. However, utilization of the compressed open-cell foam in accordance with some embodiments may enable suspension of a receiver achieving both good vibroacoustic stability (which in turn may enable high gain) and effective protection from impact. Furthermore, miniaturization and/or cost reduction and/or efficiency of manufacture may be provided in accordance with some embodiments.

A solution according to some embodiments, in particular use of the desired compression of the open-cell foam, may achieve a stable hearing device in a time saving and/or cost saving manner during design and/or development and/or manufacture. With respect to the design and development, expensive and/or time-consuming topology optimized suspension may be avoided or at least mitigated.

The receiver of the hearing device may be provided within a receiver chamber and/or within a frame structure of the hearing device, e.g., of a housing of the hearing device. The receiver chamber may form part of the frame structure of the hearing device, e.g., forming part of the frame structure of a housing of the hearing device. The second section of the hearing device may consist of and/or comprise the receiver chamber and/or a part of the receiver chamber, such as a sidewall of the receiver chamber, and/or the second section of the hearing device may consist of and/or comprise a part of the frame structure of the hearing device. According to some embodiments, the first section may provide suspension of the receiver, such as within the receiver chamber. The receiver chamber may be configured for accommodating the receiver and the open-cell foam provided between the receiver and the second section (e.g., the receiver chamber). Compared to prior art suspension of a receiver of a hearing device, e.g., a rubber suspension of a receiver of a hearing device, the embodiments described herein enable provision of a hearing device with a receiver chamber having a smaller volume for accommodation of both receiver and suspension of the receiver.

Rubber may be used as receiver suspension. Using open-cell foam (for instance instead of rubber or at least in part instead of rubber) as receiver suspension may reduce the size of the hearing device, i.e., the size needed for accommodation of the suspension of the receiver. Rubber suspension may need to be designed geometrically softer to provide impact protection and to isolate the receiver vibration, which usually takes more space than a flat rubber part. Open-cell foam may in general be softer and may be soft enough to protect the receiver sufficiently from impact and to attenuate the receiver vibration sufficiently, e.g., by using a flat piece of open-cell foam. Accordingly, using open-cell foam as receiver suspension may save space compared to prior art solutions.

The stiffness of open-cell foam is not linear. It varies along the strain. By applying compression according to some embodiments, the open-cell foam becomes softer than if uncompressed, and therefore may provide improved vibration attenuation. Meanwhile, the open-cell foam should preferably also be able to protect the receiver in an impact situation. Accordingly, the desired compression of the open-cell foam between the receiver and the second section may be a compromise at least between desired vibration attenuation and desired impact protection.

The embodiments described herein may facilitate miniaturization by enabling a hearing device, such as a hearing aid, such as a BTE hearing aid, with a smaller volume receiver chamber and/or a smaller volume needed for suspension of the receiver, and thus a smaller hearing device, while the receiver vibration is isolated similar or better than what for instance a rubber suspension enables and while a desired protection of the receiver from impact is provided.

Prior art receiver suspensions may be bulky and difficult to align without biasing the receiver and usually must be developed differently for any specific receiver. The embodiments described below may be implemented to provide improved modular manufacture and/or any of the advantages or objects stated in the present disclosure.

BRIEF DESCRIPTION OF THE DRAWINGS

The summary represents an overview of some of the teachings of the embodiments, and is not intended to be an exclusive or exhaustive treatment of the subject-matter. Further details about the subject-matter are found in the detailed description and appended claims. The scope of the claimed invention is defined by the appended claims and their legal equivalents.

To better appreciate how the above-recited and other advantages and objects are obtained, embodiments are described in more detail with reference to the appended drawings. The drawings illustrate the design and utility of embodiments, in which similar elements may be referred to by common reference numerals. The drawings are not necessarily drawn to scale. The drawings may depict only typical embodiments and are not therefore to be considered limiting of the scope of the claimed invention.

Both the foregoing and the following description provide exemplary embodiments. Other systems, methods and features are apparent to one having ordinary skill in the art upon examining the drawings and the description. It is intended that all such additional systems, methods, and features be included in this description, and be within the scope of the claimed invention.

Figure 1:
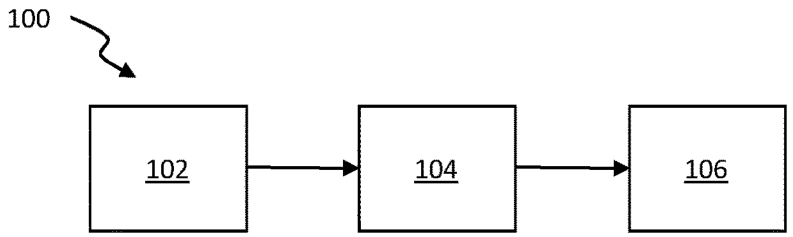

FIG. 1 schematically illustrates some basic functional electronic components of a first embodiment of a hearing device.

Figure 2:
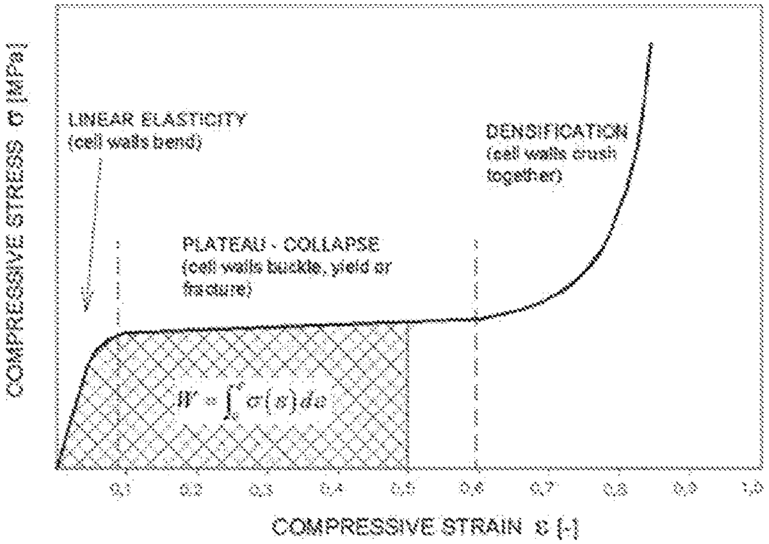

FIG. 2 schematically illustrates a typical stress-strain behaviour of an open-cell foam subject to compression.

Figure 3:
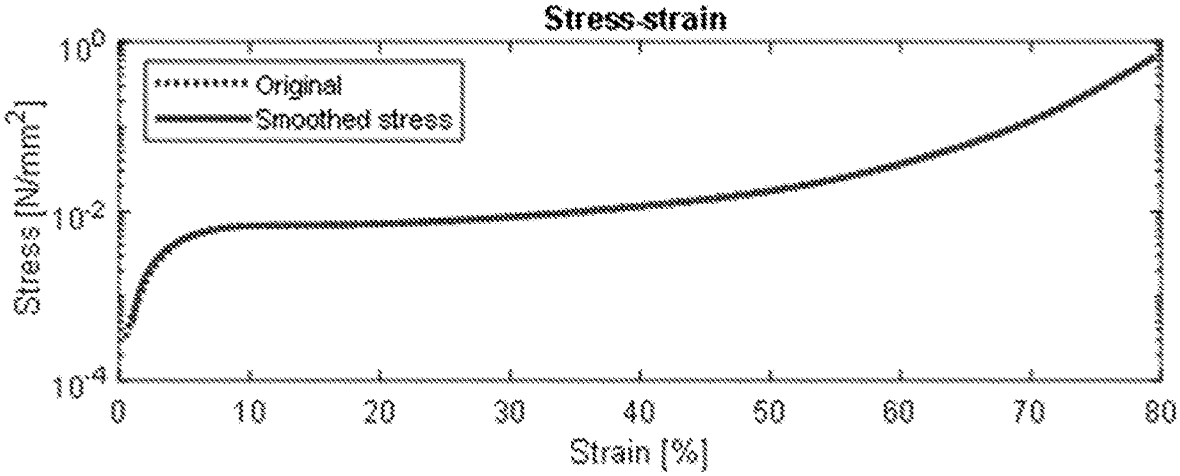

FIG. 3 schematically illustrates a stress-strain curve for an open-cell polyurethane foam.

Figure 4:
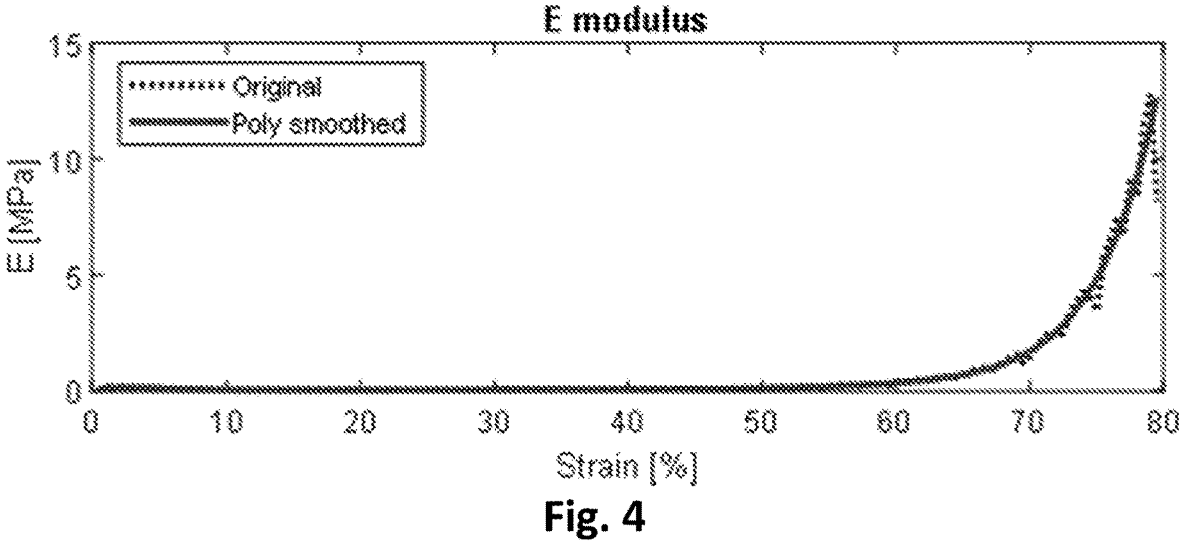

FIG. 4 schematically illustrates the elastic modulus-strain curve corresponding to the stress-strain curve of FIG. 3.

Figure 5:
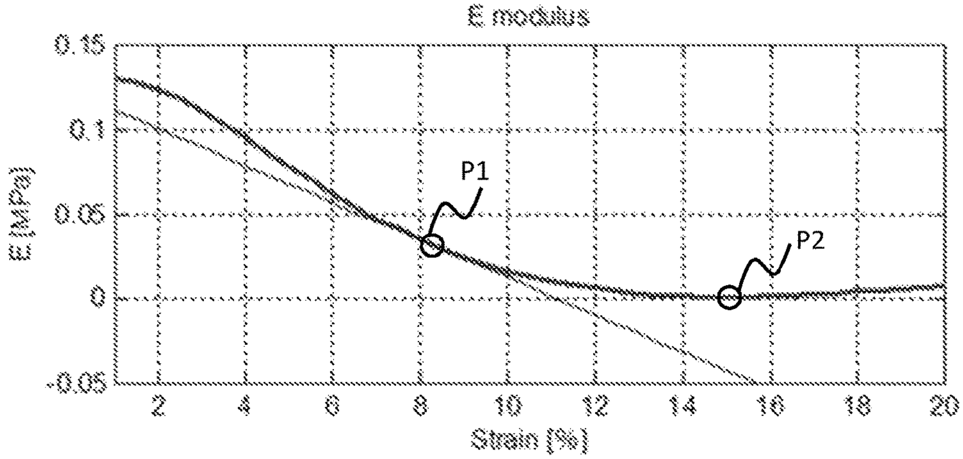
Figure 6:
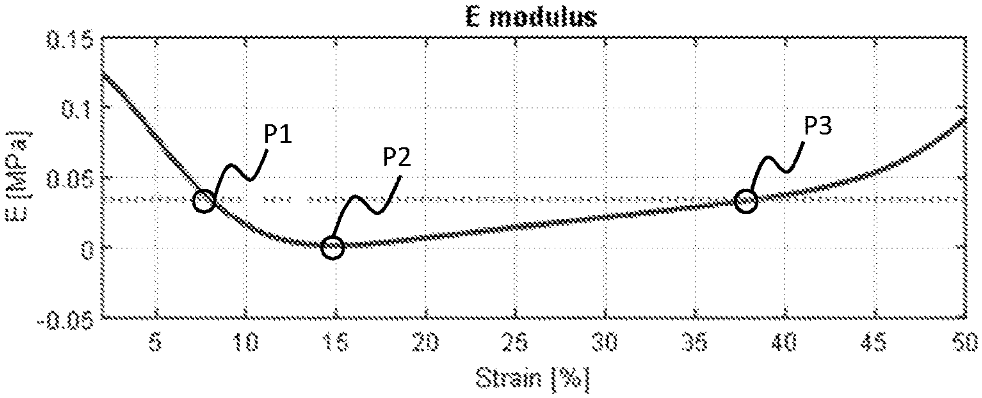

FIGS. 5 and 6 schematically illustrate respective parts of the elastic modulus-strain curve of FIG. 4.

Figure 7:
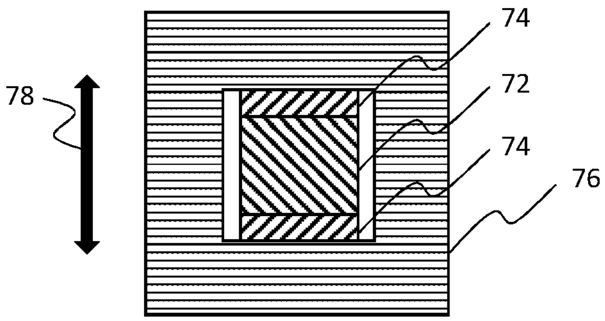

FIG. 7 schematically illustrates a part of a measurement setup for measuring resonance frequency.

Figure 8:
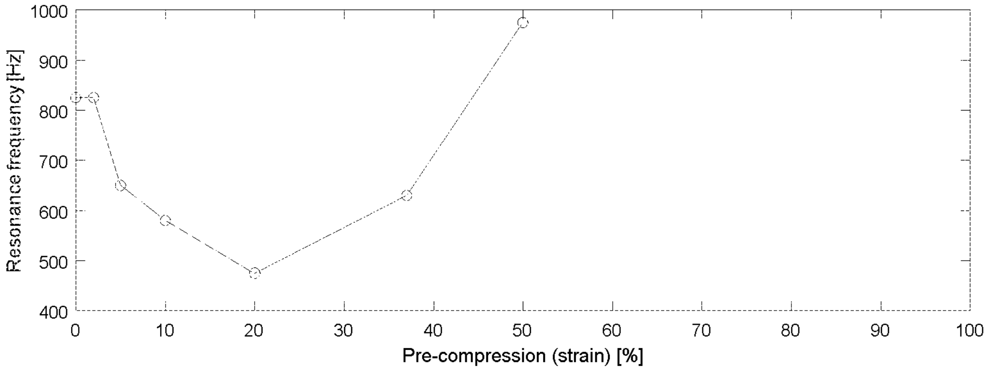

FIG. 8 schematically illustrates results obtained from the measurement setup illustrated in part by FIG. 7.

Figure 9:
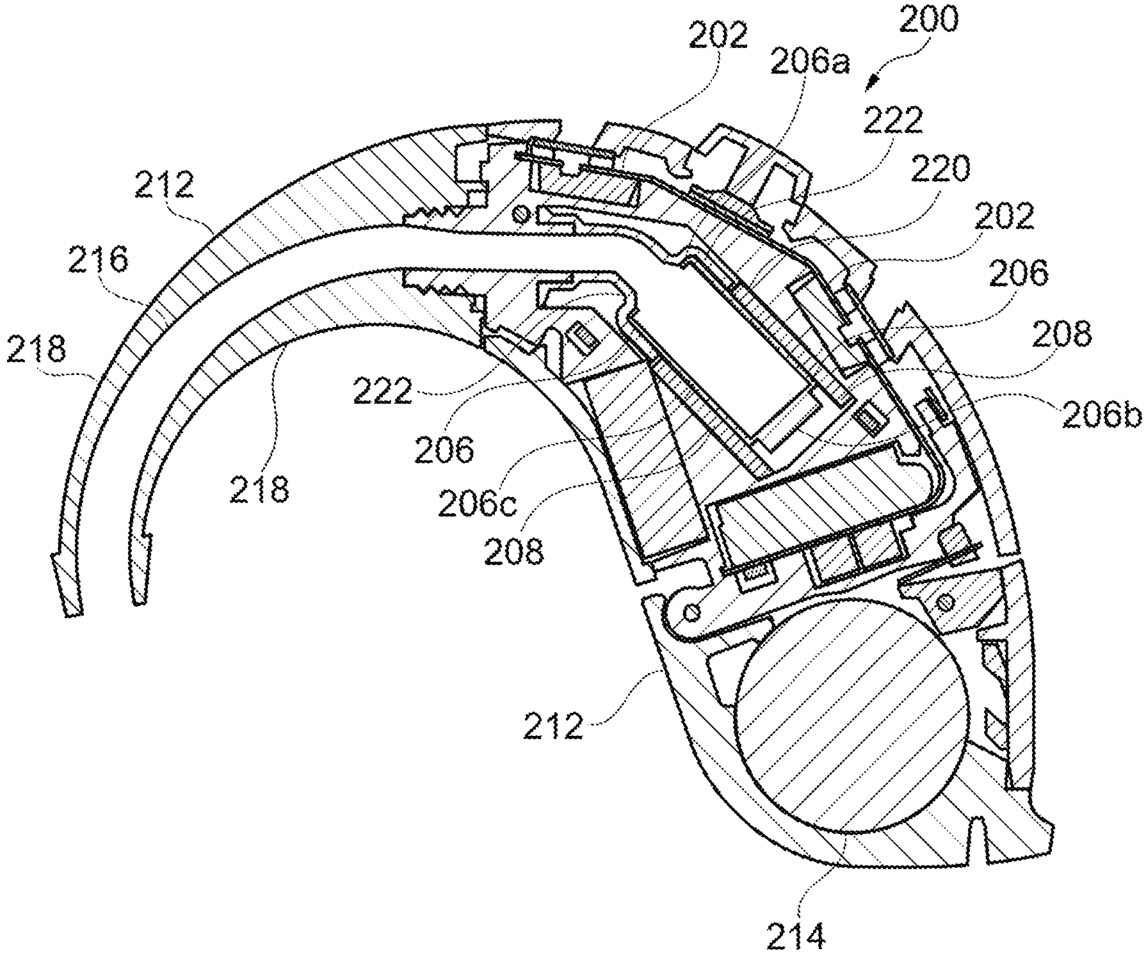

FIG. 9 schematically illustrates a cross-sectional view of a second embodiment of a hearing device.

Figure 10:
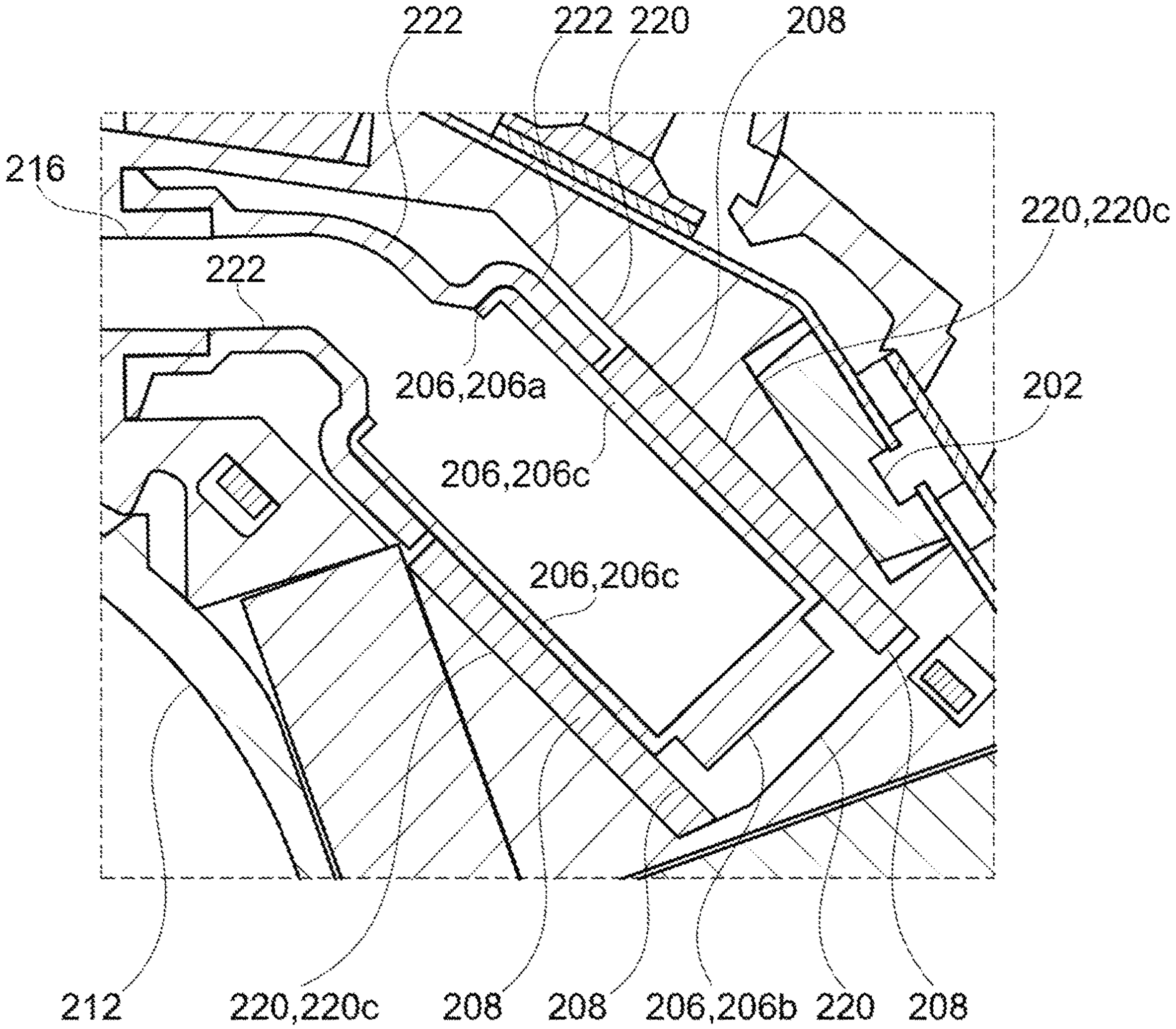

FIG. 10 schematically illustrates a part of the embodiment of FIG. 9.

Figure 11:
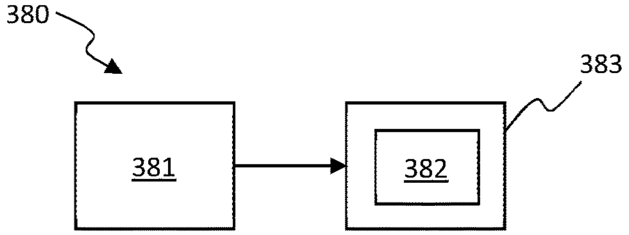

FIG. 11 schematically illustrates a first embodiment of a method for providing a hearing device.

Figure 12:
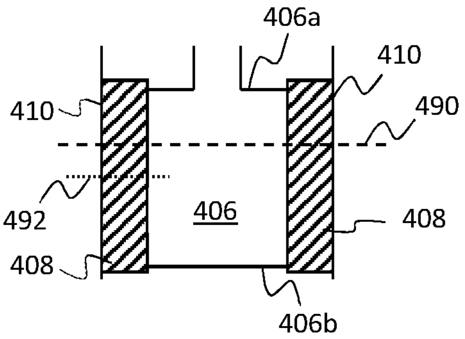
Figure 13:
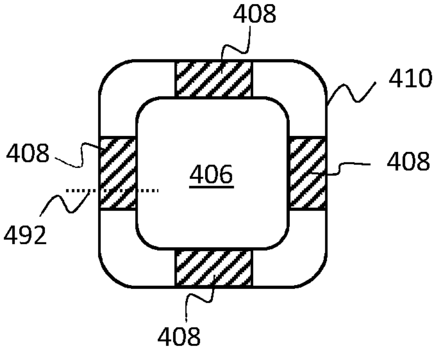

FIGS. 12 and 13 schematically illustrate cross-sectional views showing open-cell foam being compressed between a receiver and a second section of a hearing device according to some embodiments.

Figure 14:
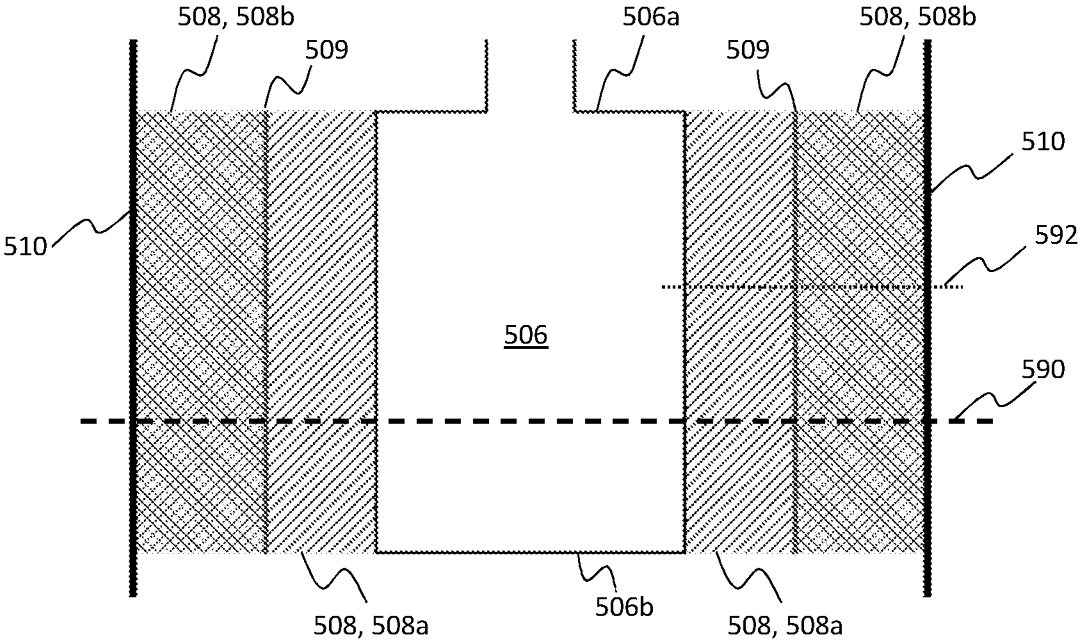
Figure 15:
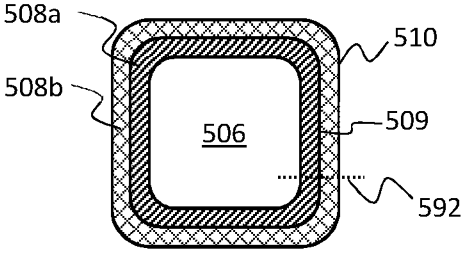

FIGS. 14 and 15 schematically illustrate cross-sectional views showing open-cell foam being compressed between a receiver and a second section of a hearing device according to some embodiments.

DETAILED DESCRIPTION

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

One, more, or all of the following definitions may be applied for interpreting terms applied to features of the embodiments disclosed herein and are meant only to define elements within the present disclosure. No limitations on terms used within the claims are necessarily intended, or should necessarily be derived, thereby. Terms used within the appended claims may or should only be limited by their customary meaning within the applicable arts.

The term “comprise”, when used in the present disclosure, is taken to specify the presence of stated features, integers, steps, components, etc., but does not necessarily preclude the presence or addition of one or more other and/or additional features, integers, steps, components, or groups thereof.

Throughout the present disclosure the terms: “first”, “second”, “third”, etc., as well as the terms: “primary”, “secondary”, “tertiary”, etc., as well as any combination hereof are merely understood as arbitrary identifiers of the respective features.

Throughout the present disclosure the term “open-cell foam” is understood as referring to open-cell foam of the/a first section of the/a hearing device.

Reference is made to FIG. 1, which schematically illustrates some basic functional electronic components of a first embodiment 100 of a hearing device, wherein the hearing device is a hearing aid 100 comprising an input transducer 102, a processor 104, and a receiver 106. A first section and a second section of the hearing device are not illustrated in FIG. 1. Various implementation examples according to one or more embodiments of the first section and the second section of the hearing device 100 is illustrated for instance by FIGS. 9 and 10 and by FIGS. 12-15.

During operation, the input transducer 102 (a microphone) receives sound from the environment and converts the sound into an input signal. After amplification, e.g., by a pre-amplifier, the input signal is sampled and digitized to result in a digitized input signal that is passed to the processor 104. The processor 104 processes the digitized input signal into an output signal in a manner that compensates for the hearing loss of a user of the hearing aid 100 (e.g., frequency-specific amplification and compression). The output signal is then converted to analogue form and passed to an audio amplifier that drives the receiver 106 to convert the output signal into an audio output, i.e., into sound perceivable by the user. A battery supplies power for the electronic components. In a BTE hearing aid, the receiver 106 may be contained in a housing of the hearing aid, wherein the housing may be worn behind an ear of the user. In a behind-the-ear hearing aid of the BTE, RIE or MaRIE type or in an in-the-ear hearing aid of the ITE, ITC, CIC or IIC type, the receiver 106 may be contained in a housing of the hearing aid, wherein the housing may be worn at or in the ear canal. An acoustic path for sound produced by the receiver may include a sound tube of the hearing aid connected to an earpiece of the hearing aid, which earpiece may be placed in the ear of the user.

Throughout the present disclosure the term "strain" is understood as "compressive strain" or "compression". Similarly, the term "stress" is understood as "compressive stress".

A typical stress-strain behaviour (also denoted stress-strain relation or curve) of open-cell foam (such as an open-cell polymer foam) subject to compression is schematically illustrated in FIG. 2. In this figure, the stress-strain curve exhibits three regions or phases: a linear elastic phase up to small strains (usually up to 5%-10%), a plateau phase, and a densification phase. In the linear elastic region, the slope of the stress-strain curve characterizes the Young's modulus of the open-cell foam. As the load increases, the cell walls begin to collapse which progresses at a roughly constant load, thus giving a stress plateau. The stress plateau (or plateau phase) is a region where stress does not increase significantly with increase in strain. Accordingly, the stress-strain curve is roughly horizontal compared to the two other phases. A further increase in load leads to densification of collapsed cell walls, which causes the stress to increase rapidly without an appreciable increase in strain. Accordingly, the open-cell foam will appear softer when in the plateau phase than when in any of the two other phases, since a small increase in stress will result in a relatively larger increase in strain for the plateau phase. Accordingly, the open-cell foam may be compressed between the receiver and the second section such that the open-cell foam is within the plateau phase.

Energy absorbed by the open-cell foam when being subject to increase of stress (i.e., pressure) is given by the area under the stress-strain curve. During impact compression, for instance, in an impact period of a drop, energy stored by the open-cell foam is represented by the area under the stress-strain curve, like the one shown in FIG. 2. The stored energy is released later in the decompression period of the open-cell foam. The open-cell foam's compression and decompression increase the impact time, and therefore, attenuates the acceleration of the receiver and thus, reduces the risk of damage of the receiver. As can be seen, a relatively small amount of energy is absorbed in the linear elastic region if the open-cell foam is subject to increase of stress since the resulting increase in strain is relatively small. The plateau region of the stress-strain curve provides a relative higher energy absorption by the open-cell foam being subject to increase of stress since the resulting increase in strain is relatively large. If the densification phase is reached, the energy absorption is also here relatively small when the open-cell foam is subject to increase of stress. The absorbed energy (w) as indicated in FIG. 2 is shown from the uncompressed state till a strain, c, of 0.5 (or 50%)).

To have a relatively good impact protection of the receiver it may be desired that the open-cell foam absorbs a relative high amount of the corresponding shock energy.

Accordingly, it may be desired to provide a pre-compression (or "bias compression", or "compression") of the open-cell foam, such that the open-cell foam is in the plateau phase or at least close to the start of the plateau phase when provided between the receiver and the second section. It may be preferred that the compression of the open-cell foam is such that it is in the beginning of the plateau phase or just before the plateau phase (i.e., in the last part of the linear phase). Accordingly, the open-cell foam will be in (or close to) the "soft" (or softest) phase at least during the start of an impact. It may be desired that the suspension is as soft as possible for impact protection. Furthermore, it may be desired that the open-cell foam remains relatively soft throughout a relatively large impact. Accordingly, it may be desired that the compression of the open-cell foam is not at the end of the plateau phase or near the end of the plateau phase. If merely hard impact protection is desired (e.g., disregarding resonance) no compression of the open-cell foam may be preferred to have longer travel distance before the open-cell foam densifies and thus becomes increasingly hard. However, as stated in the present disclosure, it may be desired to seek a compromise between impact protection and various other factors, such as vibroacoustic stability, miniaturization, cost, and ease of manufacture.

The desired and/or optimal compression of the open-cell foam may be found on case-by-case basis of the hearing device, since it may depend on the receiver (e.g., weight and size hereof), the specific material of the open-cell foam, and the mechanical design of the hearing device. The degree of compression (i.e., compression percentage or strain percentage) may be easily adjusted and may to some degree be easy to handle in the development of the hearing device. The degree of compression may for instance be provided and/or adjusted by adapting the thickness of the open-cell foam and/or adapting the space available for the open-cell foam, for instance by the relative size of the receiver and the receiver chamber (i.e., the interior of the receiver chamber).

A preferred compression of the open-cell foam may be defined in terms of the elastic modulus. An elastic modulus (also known as modulus of elasticity, for instance denoted "E modulus") is a quantity that measures an object or substance's resistance to being deformed elastically (i.e., non-permanently) when a stress is applied to it. The elastic modulus of an object is defined as the slope of its stress-strain curve in the elastic deformation region: A stiffer material will have a higher elastic modulus and a softer material will have a lower elastic modulus. Elastic modulus may be referred to as "stiffness".

FIG. 3 schematically illustrates a stress-strain curve (i.e., simulated (denoted "original" in the figure) and smoothed) for an open-cell polyurethane foam.

The values of the simulation are based on measurements of a particular open-cell polyurethane foam. However, similar result can be obtained from any other open-cell foam. The open-cell polyurethane foam used for the measurements is the proprietary foam "Poron 79-09021P", also denoted "Poron foam 4790-79TS1-09021". FIG. 4 schematically illustrates the elastic modulus-strain curve corresponding to the stress-strain curve of FIG. 3. The simulation of the stress-strain curve, and correspondingly the slope hereof (i.e., the elastic modulus strain curve) show some fluctuations due to numerical errors, which are clearly visible at least in the high-strain region of FIG. 4. Accordingly, the respective smoothed lines are introduced, which are generated by curve fitting to the calculated/simulated values, e.g., by fitting a polynomial function. The smoothed line in FIG. 4 may be provided by finding the slope of the smoothed line in FIG. 3 or by curve fitting to the calculated/simulated values of FIG. 4.

FIGS. 5 and 6 schematically illustrate respective parts of the elastic modulus-strain curve (the smoothed line hereof) of FIG. 4. As can be seen, the elastic modulus has a global minimum (denoted "second point" P2), which for the specific open-cell foam of FIGS. 3-6 is at about 15% strain. The points P2, P1, and P3 (referred to below) are indicated by respective circles on the elastic modulus-strain curve on FIGS. 5 and 6. The tangent illustrated in FIG. 5 indicates the knee point (or elbow point) (denoted "first point" P1) of the curve before the global minimum, which for the specific open-cell foam of FIGS. 3-6 is at about 8% strain. The term "before" (i.e., before the global minimum/before the second point) is understood as at a lower strain value.

The dotted line in FIG. 6 is a horizontal line provided at the elastic modulus value of the first point P1, i.e., the knee point before the second point P2 (i.e., the global minimum). As can be seen from FIG. 6, the horizontal line and the elastic modulus-strain curve intersect each other at the first point P1 and at a third point P3, which is defined as the point of the elastic modulus-strain curve being located after the second point P2 and having an elastic modulus value being equal to the elastic modulus value of the first point P1. For the specific open-cell foam of FIGS. 3-6, the third point P3 is at about 38% strain. The term "after" (i.e., after the second point) is understood as at a higher strain value.

The first, second, and third points (i.e., having the same definition as stated above and throughout the present disclosure) may be found within the respective elastic modulus-strain curve of any open-cell foam. The exact strain-values of the first, second, and third points, respectively, may however differ between different open-cell foam types and/or substrates.

The elastic modulus-strain curve of the open-cell foam in accordance with some embodiments may be understood as the static elastic modulus-strain curve. Respective dynamic curves may be modelled in dependence of vibration frequency for obtaining a more complex model of the open-cell foam.

Provision of compressed open-cell foam between the receiver and the second section (e.g., receiver chamber) such that the receiver is connected to the second section via the first section (i.e., comprising the open-cell foam) may imply that the resonance frequency may be modelled as a spring-damper structure that connects the two bodies: the receiver, and the second section of the hearing device, wherein the second section may form part of and/or may be rigidly connected with a housing of the hearing device.

For a hearing device where the open-cell foam wraps around the receiver, i.e., wherein the open-cell foam is not simply provided "above" and "below" the receiver, a model of the system for simulating the frequency response becomes more complex. However, the spring-damper structure as described above may represent a simple compromise of a model for calculating and/or simulating resonance frequency of the receiver. For such model it can be shown that the resonance frequency is proportional to the square root of the stiffness of the open-cell foam. Generally, vibration attenuation occurs at frequencies above the resonance frequency. Hence, the softer the open-cell foam is, the better it attenuates the vibration. Accordingly, it may be desired that the compression of the open-cell foam is such that the elastic modulus is relatively low, e.g., at or around the global minimum, and/or between the first point and the third point of the elastic modulus-strain curve. An advantage hereof is improved vibroacoustic stability of the hearing device, which may imply high gain of the hearing device, for instance when in form of a hearing aid.

FIG. 7 schematically illustrates a part of a measurement setup for measuring resonance frequency of a receiver of a hearing device. The setup comprises a load 72, which represents the receiver of the hearing device, open-cell foam 74 provided at opposite sides of the load 72, such that the load 72 is suspended by the open-cell foam 74 within a fixture 76, which represents the second section (e.g., a receiver chamber) and any part of the hearing device forming a rigid connection with the second section. The load 72 and the fixture 76 are provided in steel and are thus considered rigid and non-elastic. The fixture 76 is fixed to a shaker (not illustrated) and vibrated along the directions indicated by the arrow 78. Accordingly, the measurement setup is configured for measuring resonance frequency for a situation where the mass of the load 72 (i.e., receiver) is infinitesimal compared to the weight of the fixture 76 (e.g., including a housing of the hearing device). The two open-cell foam parts 74 are glued symmetrically on the top and bottom sides, respectively, of the load 72. Each of the two parts of the open-cell foam 74 are compressed between the load 72 and the fixture 76. The fixture 76 is excited by the shaker and the load 72 vibrates in a manner determined by the stiffness and damping of the open-cell foam 74 and the load 72. Using the setup illustrated in FIG. 7, the stiffness frequency response (and thus, resonance frequency) is measured with various fixed strains of the open-cell foam 74. This is carried out by varying the space available for the open-cell foam 74 by having different fixtures 76 with different inner dimensions (i.e., in the same direction as indicated by the arrow 78) while maintaining the same uncompressed thickness of the open-cell foam 74. The results are schematically illustrated in FIG. 8, showing the respective measurements of the resonance frequency at various fixed strains of the open-cell foam 74 indicated by circles being connected with lines showing a rough resonance frequency-strain relationship (or curve). The open-cell foam 74 used for obtaining the result of FIG. 8 is different from the open-cell foam used for obtaining the results illustrated in FIGS. 3-6. The open-cell foam 74 used in the setup illustrated by FIG. 7 for obtaining the results of FIG. 8 is a particular open-cell polyurethane foam. However, similar result can be obtained from any other open-cell foam. The open-cell polyurethane foam used for the measurements of FIG. 8 is the proprietary foam "Poron 06030-90", also denoted "Poron foam 4701-15TS1-06030-90". The results of FIG. 8 are at least roughly in accordance with the abovementioned proportionality of the resonance frequency to the square root of the stiffness of the open-cell foam. Furthermore, it can be interpreted from FIG. 8 that a certain range (e.g., a desired range and/or predefined range) of compression (or pre-compression) of the open-cell foam will lower the resonance frequency compared to: uncompressed, less compressed, and more compressed open-cell foam. Accordingly, it may be desired to provide a hearing device with a compression of the open-cell foam between the receiver and the second section of the hearing device according some embodiments.

If the same open-cell foam is utilized for obtaining the results illustrated in FIGS. 8 and 6, respectively, the respective global minima and the respective knee points before the respective global minima, would be at the same strain values.

The hearing device may be an electroacoustic device configured for generating sound to one or more ears of a user. The generation of sound by the hearing device may be dependent on a signal from one or more input transducers (e.g., microphone(s)) of the hearing device.

The receiver may have a front end, a rear end opposite to the front end, and a sidewall provided between the front end and the rear end. The sidewall may encircle (e.g., pass completely around) inner parts of the receiver. The sidewall of the receiver may be cylindrical, i.e., having a circular cross-section. Alternatively, the sidewall may be defined by rectangular or squared cross-section, e.g., with rounded corners. The receiver may have a front part and a rear part. The front part of the receiver may include the front end and the part of the sidewall being at the front end, e.g., any part of the sidewall being closer to the front end than to the rear end. The rear part of the receiver may include the rear end and the part of the sidewall being at the rear end, e.g., any part of the sidewall being closer to the rear end than to the front end. A length of the receiver may be defined by the length of the sidewall of the receiver and /or the distance, such as the shortest distance, between the front end and the rear end of the receiver.

The first section may comprise or consist of the open-cell foam. The first section may provide suspension of the receiver with respect to the second section. The first section may provide impact protection between the receiver and the second section. The first section may provide dampening of vibration between the receiver and the second section. The impact protection provided according to some embodiments described herein may reduce the risk of damage of the receiver caused by impact of the hearing device.

The second section may be relative stiff, for instance compared to the open-cell foam of the first section.

The open-cell foam having at least the strain value of the first point and at most the strain value of the third point may be understood such that the open-cell foam is strained to a value between the first point and the third point.

The open-cell foam of the first section being compressed between the receiver and the second section may imply that the open-cell foam is provided within a space defined by the hearing device, e.g., hearing aid, which space requires that the open-cell foam is compressed for being situated within that space. For instance, if the receiver is provided within the second section (e.g., receiver chamber), the mutual dimensions of the receiver and the second section may be provided such that an inner diameter of the second section is larger than an outer diameter of the receiver. This difference may provide a gap or clearance between the receiver and the second section, such as a gap or clearance around the receiver when situated within the second section. Accordingly, the hearing device may be provided such that a ratio between the thickness of the gap and the thickness of the open-cell foam in the uncompressed form provides the desired compression of the open-cell foam when the open-cell foam is provided within the gap between the receiver and the second section, such as around and/or surrounding the receiver. Accordingly, the compressed open-cell foam of the first section and the second section (e.g., the receiver chamber) may be provided concentric around the receiver.

According to one or more embodiments, the first section may comprise one or more other components provided between the receiver and the second section, i.e., in addition to the open-cell foam being compressed between the receiver and the second section.

The open-cell foam being compressed between the receiver and the second section may imply that the compression is in a direction defined between the receiver and the second section. The direction of compression may for instance be defined perpendicular to a surface of the receiver and/or a surface of the second section, such as a surface hereof providing contact with the open-cell foam.

The open-cell foam being compressed between the receiver and the second section may imply that the stated compression is provided for at least one part, such as at least one sub-part of the open-cell foam. Accordingly, the compression may be provided at least along one straight line extending between the receiver and the second section, such as at least along a straight line extending perpendicular from a surface of the receiver and/or a surface of the second section.

The method for providing a hearing device may comprise manufacture and/or assembly of the hearing device.

The step of compressing the open-cell foam of the first section between the receiver and the second section may imply that the receiver and the second section are provided such that a gap or clearance exist there between wherein the open-cell foam is provided, and wherein the thickness of the open-cell foam in the uncompressed state is greater than the available space for the open-cell foam in the gap or clearance between the receiver and the second section.

The method for identifying may be or may comprise a computer-implemented method, such as a computer-implemented simulation. Identifying a global minimum of an elastic modulus-strain curve of the open-cell foam may imply a process or step of approximation of the global minimum.

The open-cell foam may be strained to at least around the strain value of the second point, i.e., the second point of the elastic modulus-strain curve, such as at least to the strain value of the second point. This may provide improved design tolerance for high volume production.

The open-cell foam may be strained to at most around two times the strain value of the second point, such as at most two times the strain value of the second point.

The receiver may have a resonance frequency being a function of strain of the open-cell foam. The resonance frequency as a function of strain of the open-cell foam may define a curve that has a primary point defined by a knee point before a secondary point defined by a global minimum of the resonance frequency. The compression of the open-cell foam between the receiver and the second section may be such that the open-cell foam is strained to at least the strain value of the primary point.

The open-cell foam may be strained to a strain value around or at the strain value of the secondary point. The open-cell foam may be strained to at most 3 times the strain value of the secondary point, such as at most 2 times the strain value of the secondary point.

The open-cell foam may have a stress-strain curve (or relation) that comprises: a linear elastic phase, a plateau phase, and a densification phase. The stress-strain curve may have a knee point within the linear elastic phase and before the plateau phase. The compression of the open-cell foam may be such that the open-cell foam is strained to at least around or at least at the knee point of linear elastic phase, such as to at least the knee point of the linear elastic phase. The compression of the open-cell foam may be such that the open-cell foam is strained to at most within the plateau phase, i.e., such that the densification phase is not reached.

The open-cell foam may be strained to a compression of at least 8% such as at least 10% between the receiver and the second section.

The open-cell foam may be strained to a compression of at most 38% such as at most 35% between the receiver and the second section.

A preferred range of compression of the open-cell foam of the first section may be within 10-35%, a more preferred range may be within 15-25%. Different types and/or substrates of utilized open-cell foam may be a cause of different preferred ranges and/or values of compression. The preferred range may be within 10-27%, which for instance may be preferred if the utilized open-cell foam comprises or consists of the proprietary foam "Poron 79-09021P". The preferred range may be within 13-31%, which for instance may be preferred if the utilized open-cell foam comprises or consists of the proprietary foam "Poron 92-12059P". The preferred range may be within 17-32%, which for instance may be preferred if the utilized open-cell foam comprises or consists of the proprietary foam "Poron 40-30045".

The open-cell foam may have a density of or around 0.1 g/cm$^3$ when uncompressed.

The open-cell foam may comprise a polymer such as polyurethane. The open-cell foam may be a polymer open-cell foam, such as a polyurethane open-cell foam.

The second section may comprise and/or define a first part of a housing section of the hearing device and/or a receiver chamber of the hearing device. The receiver chamber may provide magnetic shielding of the receiver. This may be for reducing magnetic radiation as produced by the receiver from disturbing other electronic components of the hearing device and/or to be in compliance with radiation limits of the hearing device.

The receiver, such as the sidewall of the receiver, may be encircled by the open-cell foam, i.e., the open-cell foam may for instance pass completely around the receiver. The open-cell foam may wrap around the receiver, e.g., around the sidewall of the receiver, such that the open-cell foam is compressed between the receiver and the second section (e.g., receiver chamber). The receiver, the open-cell foam, and the second section may be provided concentric.

The open-cell foam may be provided as a sheet, for instance of uniform thickness when uncompressed, which sheet may wrap around the receiver. Such sheet may have a length being the same or substantially the same as the receiver, e.g., as a sidewall of the receiver. According to embodiments, a sheet of open-cell foam with varying thickness when uncompressed may be provided. When such sheet with varying thickness wraps around the receiver within the hearing device, e.g., within a receiver chamber of the hearing device, the thickness of the open-cell foam may be uniform. Accordingly, the strain may vary in accordance with the varying thickness of the uncompressed sheet.

The receiver, such as at least the sidewall or a part of the sidewall thereof, may be supported and/or suspended by the open-cell foam. The receiver may be supported and/or held by the second section via the open-cell foam.

The open-cell foam may be abutting the receiver and/or the second section. The first section may be abutting the receiver. The first section may be abutting the second section.

The open-cell foam as compressed between the receiver and the second section may have a thickness in the compressed state of within 0.3-1.5 mm, such as within 0.5-1.2 mm, such as around 1 mm, such as 1 mm. In general, a low thickness (i.e., thin) may be desired for a relatively small/light receiver, and a high thickness may be desired for a relatively large/heavy receiver.

The open-cell foam of the first section may be provided as one part or piece (e.g., wrapped around the receiver) or provided as more than one part or piece. For instance, a side part or piece of the open-cell foam may support (e.g., by being wrapped around) a sidewall of the receiver and/or a rear part or piece of the open-cell foam may support a rear end of the receiver.

Alternatively, or additionally, to other implementations of the open-cell foam of the first section of a hearing device according to some embodiments, such as in addition to or as an alternative to provision of a sheet of open-cell foam that wraps around the receiver, the hearing device may comprise open-cell foam of the first section being compressed between the receiver and the second section, wherein the open-cell foam of the first section comprises one or more parts, e.g., provided as:

- stripes, e.g., provided with arbitrary angles and/or distances between the stripes,
- isolated patches of foam, e.g., placed at the sidewall of the receiver, e.g., patches of arbitrary shapes,
- along one, more, or all sides of the receiver,
- at one, more, or all corners of the receiver, or
- any combination of the above.

Alternatively, or additionally, the open-cell foam may be provided with varying thickness (e.g., pre-compressed thickness) at various locations compressed between the receiver and the second section.

Alternatively, or additionally, two or more different types (e.g., provided by different substrates) of the open-cell foam may be utilized at various locations compressed between the receiver and the second section.

It may be preferred that the open-cell foam (e.g., provided as a sheet or as one or more parts, such as discloses above) has a length corresponding to, e.g., being the same as, the length of the receiver, e.g., the length of a sidewall of the receiver. Alternatively, the open-cell foam may extend beyond the length of the receiver and/or beyond a sidewall of the receiver, such as extending beyond the front end and/or beyond the rear end of the receiver. Accordingly, the open-cell foam may be longer than the receiver. Alternatively, the open-cell foam may be shorter than the receiver. Provision of a hearing device wherein the open-cell foam extends beyond the front end and/or beyond the rear end of the receiver may improve design tolerances, e.g., in connection with assembling the hearing device, and/or may provide improved chance that any desired part of the receiver is provided with a desired layer of open-cell foam between the receiver and the second section.

FIG. 12 schematically illustrates a cross-sectional view of a part of an embodiment of a hearing device showing open-cell foam 408 (i.e., of a first section of the hearing device) being compressed between a receiver 406 and a second section 410 (e.g., consisting of or comprising a receiver chamber) of the hearing device. FIG. 13 schematically illustrates a cross-sectional view perpendicular to the view of FIG. 12. The view of FIG. 13 is indicated by the dashed line 490 of FIG. 12. The receiver 406 as seen perpendicular to the length of the receiver 406 (i.e., as illustrated by FIG. 13) has a rectangular cross-section with rounded corners. As schematically illustrated by FIG. 12, the open-cell foam 408 is slightly longer than the receiver and extends slightly beyond the front end **406*a* and the rear end 406*b* of the receiver 406. As seen in FIG. 13, the open-cell foam 408 comprises four parts being provided as isolated patches placed at each of four plane parts of the sidewall of the receiver 406, i.e., at four different sides of the receiver 406 and/or arranged in two open-cell foam patch pars, where two open-cell foam patches 408 in a patch par are placed on opposite sides of the receiver 406. The four patches of the open-cell foam 408 are provided equidistantly and concentrically around the receiver 406. The dotted line 492 indicates an example of where the open-cell foam 408 is compressed between the receiver 406 and the second section 410**.

Alternatively, or additionally, the first section may comprise a plurality of (e.g., two or more) layers of (e.g., concentric) open-cell foam provided between the receiver and the second section. Such layers may be separated or divided by a structure, such as a rigid structure, e.g., a rigid cover, e.g., a rigid concentric sheet, that wraps around an inner layer of the layers of open-cell foam (i.e., wherein an outer layer of open-cell foam wraps around the cover). The combination of an inner layer of open-cell foam surrounded by a cover may be referred to as a "decoupling cell". Provision hereof may provide a higher order decoupling between the receiver and the second section. If more than two layers of open-cell foam are provided, then the layers may be individually separated by individual covers. Accordingly, the number of layers of open-cell foam may be one more than the number of layer(s) of covers. Various layers of open-cell foam may comprise open-cell foam of different types, e.g., of different substrates. Alternatively, or additionally, one or more layers of open-cell foam of the various layers of open-cell foam may be provided as one or more sheets that each may wrap around the receiver and/or around an inner layer of the open-cell foam. Alternatively, or additionally, one or more layers of open-cell foam of the various layers of open-cell foam may be provided as one or more pieces or patches, e.g., as disclosed above. Each decoupling cell may introduce a 12 dB/oct decoupling between the receiver and the second section. A potential drawback may be introduction of an additional resonance for each decoupling cell. It may be preferred that any resonance introduced by such decoupling cell are below a desired value, e.g., below 1.5 kHz or below 1.2 kHz. The first section may comprise or consist of one or more layers of decoupling cells including an outer layer of open-cell foam.

FIG. 14 schematically illustrates a cross-sectional view of a part of an embodiment of a hearing device showing open-cell foam 508 (i.e., of a first section of the hearing device) being compressed between a receiver 506 and a second section 510 (e.g., consisting of or comprising a receiver chamber) of the hearing device. FIG. 15 schematically illustrates a cross-sectional view perpendicular to the view of FIG. 14. The view of FIG. 15 is indicated by the dashed line 590 of FIG. 14. The receiver 506 as seen perpendicular to the length of the receiver 506 (i.e., as illustrated by FIG. 15) has a rectangular cross-section with rounded corners.

The first section comprises two layers of concentric open-cell foam 508*a*, 508*b* being of different types, wherein both are provided between the receiver 506 and the second section 510. The layers are divided by a rigid cover 509 that surrounds a first layer 508*a* of the open-cell foam, which surrounds the receiver 506.

The dotted line 592 indicates an example of where the open-cell foam 508, 508*a*, 508*b* is compressed between the receiver 506 and the second section 510. It may be sufficient that merely one of the two (or more, if provided) layers of the open-cell foam 508*a*, 508*b* are compressed between the receiver 506 and the second section 510 according to some embodiments. It may be desired that both (or all of) the layers of open-cell foam 508*a*, 508*b* are compressed between the receiver 506 and the second section 510 according some embodiments. If at least one layer of open-cell foam 508*a*, 508*b* of the first section is compressed between the receiver 506 and the second section 510 according to some embodiments, then the hearing device comprises a first section comprising open-cell foam 508 being compressed between the receiver 506 and the second section 510 according to some embodiments.

According to one or more embodiments, the compression of the open-cell foam is not uniform and/or different parts of the open-cell foam may have a non-identical compression. However, it may be preferred that uniform compression is provided. Additionally, or alternatively, uniform thickness in the compressed and/or the uncompressed state of the open-cell foam may be desired.

The features of the embodiments described herein may be used with, and/or implemented in, a hearing device designed for use in/at the right ear or the left ear or both ears of the user. Hearing devices not expressly stated in the present disclosure may be used and/or implemented in conjunction with one or more features of the embodiments.

Rubber may be used as receiver suspension (e.g., front and/or rear suspension) in a hearing device.

A front suspension of the receiver is a suspension supporting the front part of the receiver. A rear suspension of the receiver is a suspension supporting the rear part of the receiver. The open-cell foam may be provided as rear suspension of the receiver.

According to one or more embodiments, the open-cell foam is supporting at least the rear part of the receiver, e.g., supporting the entire sidewall of the receiver. Additionally, rubber may be used as an additional suspension of the front part, such as of the front end, of the receiver. Additionally, the hearing device may be void of any rubber suspension of the rear part of the receiver. Alternatively, the hearing device may be void of any rubber suspension of the receiver.

The front end of the receiver may be connected to a sound tube or sound canal of the hearing device, e.g., connected via a rubber suspension.

The open-cell foam may be compressed between the second section and the sidewall of the receiver.

The hearing device may comprise or may be a hearing aid, such as a Behind-the-Ear (BTE) hearing aid, a Receiver-in-Ear (RIE) hearing aid, a Microphone and Receiver-In-Ear (MaRIE) hearing aid, an In-the-Ear (ITE) hearing aid, an In-the-Canal (ITC) hearing aid, a Completely-in-the-Canal hearing aid (CIC), or an Invisible In-The-Canal (IIC) hearing aid.

"Behind-the-ear type" hearing aids may include devices that reside substantially behind the ear or over the ear of the user. Such devices may include hearing aids with receivers associated with the electronic portion of the behind-the-ear device, or hearing aids of the type having receivers in or at the ear canal of the user, including but not limited to RIE and MaRIE.

Hearing aids are devices configured to compensate for hearing losses, for instance by amplifying sound. A hearing aid normally comprises a plurality of electronic components, which may include one or more microphones for receiving sound (e.g., ambient sound) and for converting the sound into a microphone signal, an amplifier for amplifying the microphone signal in a manner that depends upon the frequency and amplitude of the microphone signal, a speaker (i.e., a receiver) for converting the amplified microphone signal to sound for the user, and a battery for powering the electronic components that needs power to operate, wherein power may be provided from one electronic component to another. Some or all of the electronic components of the hearing aid may be contained within one or more housing(s) of the hearing aid, e.g., a BTE housing and/or an in-ear housing of the hearing aid. The housing(s) may for instance be placed in the external ear canal or behind the ear.

A hearing aid may comprise: an input transducer, a receiver (i.e., an output transducer), and a hearing loss processor. The receiver may comprise a speaker. The input transducer may comprise a microphone. The hearing aid may comprise more than one input transducer and/or more than one microphone. The input transducer(s) may be configured for reception of sound and for conversion of the received sound into a corresponding audio signal. The hearing loss processor may be configured for processing the audio signal into an audio signal compensating a hearing loss of a user of the hearing aid, for instance in accordance with a predetermined signal processing algorithm. The receiver may be connected to an output of the hearing loss processor for converting the hearing loss compensated audio signal into an output sound signal to be provided to the user of the hearing aid, for instance to a first ear of the user.

The hearing device may comprise any of the following: a hearing aid, a headset, a headphone, an earphone, an earbud, an active ear defender/earmuff.

FIG. 9 schematically illustrates a cross-sectional view of a second embodiment 200 of a hearing device according to some embodiments. FIG. 10 schematically illustrates an enlarged view of a part of the embodiment of FIG. 9. The hearing device of FIGS. 9 and 10 is a BTE hearing aid 200. The hearing aid 200 comprises a first section comprising and consisting of open-cell foam 208. The hearing aid 200 comprises a second section comprising, e.g., consisting of, a receiver chamber 220. The hearing aid 200 comprises a housing 212, i.e., a BTE housing, that contains a battery 214, a receiver 206, a pair of omnidirectional microphones 202, and a sound tube or sound canal 216 for providing an acoustic path from the receiver 206, i.e., from a front end 206*a* of the receiver 206, towards an eardrum of a user of the hearing aid 200. The sound tube 216 extends within an ear hook 218 of the housing 212. A further sound tube or sound canal (not illustrated), e.g., a flexible plastic tube, may be provided in extension of the illustrated sound canal/sound tube 216 for conduction of sound generated by the receiver 206 to an earpiece (not illustrated) to be situated inside an ear of the user.

The receiver 206 comprises the front end 206*a*, a rear end 206*b*, and a sidewall 206*c*. The receiver comprises a front part including the front end 206*a* and any part of the sidewall 206*c* being closer to the front end 206*a* than to the rear end 206*b*. The receiver 206 comprises a rear part including the rear end 206*b* and any part of the sidewall 206*c* being closer to the rear end 206*b* than to the front end 206*a*. The receiver 206 is contained within a receiver chamber 220 provided within the housing 212, e.g., provided by the housing 212, e.g., forming part of the housing 212.

The open-cell foam 208 (i.e., at least part of the open-cell foam 208 of the hearing aid 200) is provided between the receiver 206 and the receiver chamber 220. The open-cell foam 208 wraps around the rear part of the receiver 206. The open-cell foam 208 extends beyond the rear part of the receiver 206, more particularly, it extends beyond the rear end 206*b* of the receiver 206 and it extends over a part of the front part of the receiver, i.e., the open-cell foam 208 wraps around a part of the front part of the receiver 206. The open-cell foam 208 (i.e., at least part of the open-cell foam 208 of the hearing aid 200) is compressed between the sidewall 206*c* of the receiver 206 and an opposing sidewall of the receiver chamber 220. The part of the open-cell foam 208 that extends beyond the rear end 206*b* of the receiver 206 is however not compressed between the receiver 206 and receiver chamber 220. Accordingly, the thickness of the open-cell foam 208 extending beyond the rear end 206*b* of the receiver 206, which part is uncompressed, is larger than the thickness of the open-cell foam 208 being compressed between the sidewall 206*c* of the receiver 206 and an opposing sidewall of the receiver chamber 220. This aspect is however not clearly visible in the schematic illustrations of FIGS. 9 and 10.

Accordingly, the receiver 206 is connected to the second section, i.e., the receiver chamber 220, via the first section, i.e., via the open-cell foam 208. The first section, i.e., the open-cell foam 208, provides a direct connection between the receiver 206 and the second section, i.e., the receiver chamber 220.

The hearing aid 200 comprises a rubber suspension 222 supporting the front part of the receiver 206 by connection to the sound tube 216. A part of the rubber suspension 222 is provided between the receiver 206 and the receiver chamber 220. However, since the gap or clearance between the receiver 206 and the receiver chamber 220 is larger than the thickness of the rubber suspension 222, as provided therebetween, the rubber suspension 222 does not provide any direct connection between the receiver 206 and the receiver chamber 220. This relation may be stated as the rubber suspension 222 being thinner than the compressed open-cell foam 208. According to other embodiments, a rubber suspension may provide direct support between the receiver and the second section, e.g., receiver chamber 220. According to one or more embodiments, the open-cell foam 208 supports the entire sidewall 206*c* of the receiver 206. According to one or more embodiments, the open-cell foam 208 supports (e.g., also supports) the rear end 206*b* of the receiver 206.

The hearing device may be a hearing aid such as a digital hearing aid comprising a processor. The processor may be programmed to provide correction of a hearing loss, for instance with a programmable gain and/or frequency compression being employed to tailor the hearing aid output to the particular hearing loss of a user. The processor may be a digital signal processor (DSP), microprocessor, microcontroller, other digital logic, or any combination thereof. The processing of signals may be performed using the processor. Processing may be carried out in the digital domain, the analogue domain, or a combination thereof. Processing may be carried out using sub-band processing techniques. Processing may be carried out with frequency domain or time domain approaches. Some processing may involve both frequency and time domain aspects. For brevity, drawings may omit certain blocks that perform one, more, or all of: frequency synthesis, frequency analysis, analogue-to-digital conversion, digital-to-analogue conversion, amplification, and certain types of filtering and processing. In various embodiments the processor is adapted to perform instructions stored in memory which may or may not be explicitly shown. Various types of memory may be used, including volatile and non-volatile forms of memory. In various embodiments, instructions are performed by the processor to perform a plurality of signal processing tasks. In such embodiments, analogue electronic components may be in communication with the processor to perform signal tasks, such as microphone reception, or receiver sound embodiments (i.e., in embodiments where such transducers are used). In various embodiments, different realizations of the block diagrams, circuits, and processes set forth herein may occur without departing from the scope of the claimed invention.

The method for providing the hearing device according to some embodiments may comprise adhering, e.g., gluing, the open-cell foam to the receiver.

Alternatively, or additionally, the open-cell foam may be adhered, e.g., glued, to the second section. The method for providing the hearing device may comprise inserting the receiver into a receiver chamber (e.g., defined by the second section) for provision of the compression of the open-cell foam between the receiver and the second section. Accordingly, the receiver may be inserted into the receiver chamber together with the open-cell foam and may for instance be in a state of being adhered to the receiver while being inserted. Alternatively, the receiver may be inserted into the receiver chamber without being adhered to the open-cell foam prior to the insertion. Inserting the receiver into the receiver chamber may provide the desired compression of the open-cell foam.

The receiver and the first section may be adhered, e.g., glued. The receiver and the first section may be adhered prior to the receiver being inserted into the receiver chamber.

FIG. 11 schematically illustrates a first embodiment 380 of a method for providing a hearing device according to an aspect, e.g., the second aspect. The method 380 comprises adhering 381 open-cell foam (i.e., of a first section of the hearing device) to a receiver of the hearing device and, subsequently, inserting 383 the receiver with the adhered open-cell foam into a receiver chamber of the second section. The step of inserting 383 comprises compressing 382 the open-cell foam between the receiver and the second section, such that the receiver is connected to the second section via the first section and optionally such that the open-cell foam has at least the strain value of the first point and at most the strain value of the third point.

The method of identifying may comprise identifying: a knee point (i.e., first point) before the global minimum of the elastic modulus; and/or a third point of the elastic modulus-strain curve having an elastic modulus value being equal to the elastic modulus value of the knee point. The method of identifying may comprise obtaining a model of a specific open-cell foam structure, which specific open-cell foam is intended to be used in a compressed form as receiver suspension in a hearing device. The model obtained may be used for obtaining a stress-strain relation and/or an elastic modulus-strain relation.

The method for identifying may be or may comprise a computer-implemented method for identifying. The method for identifying may be executed, and/or may be configured to be executed, by means of a computer system. A computer system may for instance include any one or any combination of: a server, a client, and a cloud-computing service. The method for identifying may be provided by means of any one or any combination of: a computer program, a computer-readable medium, and a computer program product. The method for identifying may be embodied by any one or any combination of: a computer program, a computer-readable medium, and a computer program product, which may comprise means for carrying out the method for identifying. The method for identifying may be embodied by a computer program comprising instructions which, when executed by a computer system, causes the computer system to carry out the method for identifying. The computer program product according to some embodiments may be embodied by means of a computer readable medium. The method for identifying may be embodied by a computer-readable medium having stored thereon a computer program according to some embodiments. The method for identifying may be embodied by a computer-readable medium comprising instructions which, when executed by a computer system, cause the computer system to carry out the method for identifying. Any of the computer program, the computer-readable medium, and the computer program product according to some embodiments may be distributed, such as being distributed over a plurality of physical entities and/or computational entities. The method for identifying may be realized by means of a distributed computing system, which may be denoted "a distributed computing environment", such as using or comprising a computer network. Within such distributed computing system, the method for identifying may be carried out by one, more, or all of a plurality of entities, such as any combination of: one or more client computers, one or more server computers, and one or more cloud computers.

The exemplary embodiments, figures, description set forth herein are intended to be a demonstrative and not a limiting or exhaustive or exclusive depiction of the claimed invention. The scope of the claimed invention should be determined with reference to the appended claims, along with the full scope of alternatives and/or adaptations and/or variations and/or equivalents to which such claims are entitled.

The invention claimed is:

1. A hearing device comprising:

a receiver;

a first section; and a second section;

wherein the first section comprises an open-cell foam with an elastic modulus-strain curve, the elastic modulus-strain curve having a first point, a second point, and a third point, wherein the second point is defined by a global minimum of the elastic modulus-strain curve, wherein the first point is defined by a knee point before the second point, wherein the third point is located after the second point, and wherein the third point has an elastic modulus value being equal to an elastic modulus value of the first point;

wherein the receiver is connected to the second section via the first section, and wherein the open-cell foam is compressed between the receiver and the second section; and wherein the open-cell foam, as compressed between the receiver and the second section, has at least a strain value of the first point and at most a strain value of the third point.

2. The hearing device according to claim 1, wherein the open-cell foam is strained to at least a strain value of the second point.

3. The hearing device according to claim 1, wherein the open-cell foam is strained to at most two times a strain value of the second point.

4. The hearing device according to claim 1, wherein the receiver has a resonance frequency that is a function of a strain of the open-cell foam.

5. The hearing device according to claim 4, wherein the resonance frequency that is the function of the strain defines a resonance frequency-strain curve that has a primary point defined by a knee point, the knee point of the resonance frequency-strain curve being before a secondary point defined by a global minimum of the resonance frequency-strain curve.

6. The hearing device according to claim 5, wherein the open-cell foam is compressed between the receiver and the second section such that the open-cell foam is strained to at least a strain value of the primary point.

7. The hearing device according to claim 1, wherein the open-cell foam is strained to a compression of at least 10% between the receiver and the second section.

8. The hearing device according to claim 1, wherein the open-cell foam is strained to a compression of at most 35% between the receiver and the second section.

9. The hearing device according to claim 1, wherein the open-cell foam comprises polyurethane.

10. The hearing device according to claim 1, wherein the second section comprises a first part of a housing section of the hearing device.

11. The hearing device according to claim 1, wherein the receiver is encircled by the open-cell foam, and wherein the open-cell foam is abutting the receiver and the second section.

12. The hearing device according to claim 1, wherein the open-cell foam as compressed between the receiver and the second section has a thickness within 0.3-1.5 mm.

13. The hearing device according to claim 1, further comprising a sound tube, wherein the receiver has a front end, a rear end opposite to the front end, and a sidewall between the front end and the rear end, wherein the front end of the receiver is connected to the sound tube of the hearing device, and wherein the open-cell foam is compressed between the second section and the sidewall of the receiver.

14. The hearing device according to claim 1, wherein the hearing device is a hearing aid.

15. A method for providing a hearing device comprising a receiver, a first section, and a second section, wherein the first section comprises an open-cell foam with an elastic modulus-strain curve, the elastic modulus-strain curve having a first point, a second point, and a third point, wherein the second point is defined by a global minimum of the elastic modulus-strain curve, wherein the first point is defined by a knee point before the second point, wherein the third point is located after the second point, and wherein the third point has an elastic modulus value being equal to an elastic modulus value of the first point, the method comprising:

providing the open-cell foam; and compressing the open-cell foam between the receiver and the second section, such that the open-cell foam has at least a strain value of the first point and at most a strain value of the third point.

16. The method according to claim 15, further comprising adhering the open-cell foam to the receiver.

17. The method according to claim 16, wherein the act of compressing comprises inserting the receiver with the adhered open-cell foam into a receiver chamber of the second section to compress the open-cell foam between the receiver and the second section.

* * * * *